J. E. MOODY.
PRESSURE CONDUIT.
APPLICATION FILED JULY 21, 1919.

1,404,787.

Patented Jan. 31, 1922.
2 SHEETS—SHEET 1.

Inventor
Joseph E. Moody

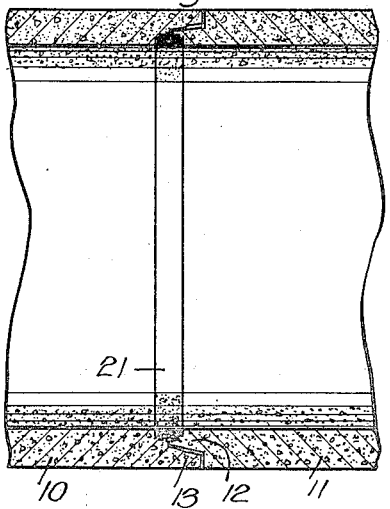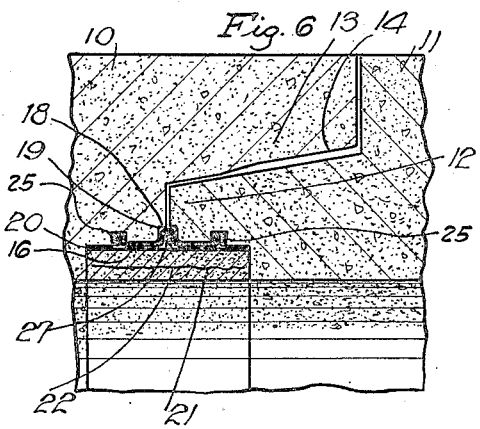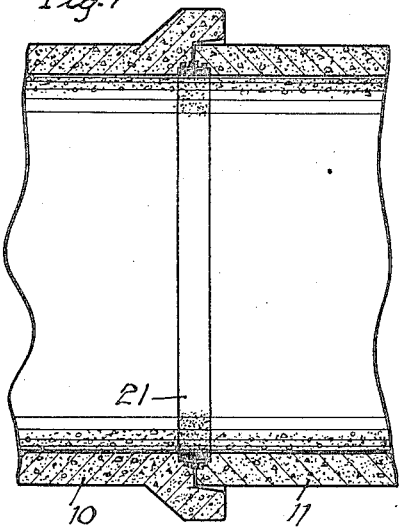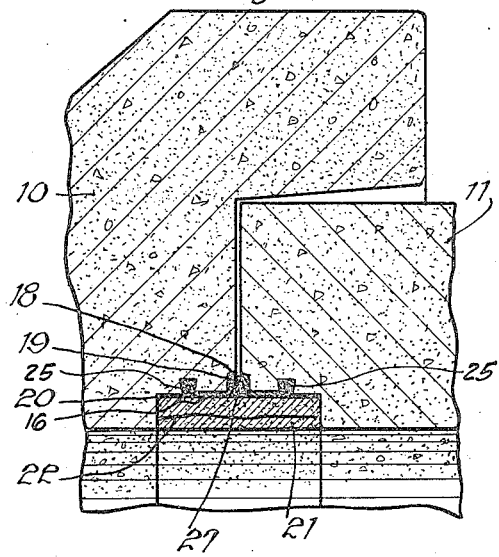

UNITED STATES PATENT OFFICE.

JOSEPH E. MOODY, OF CHICAGO, ILLINOIS.

PRESSURE CONDUIT.

1,404,787.   Specification of Letters Patent.   Patented Jan. 31, 1922.

Application filed July 21, 1919. Serial No. 312,361.

*To all whom it may concern:*

Be it known that I, JOSEPH E. MOODY, a citizen of the United States, residing at Chicago, in the county of Cook and State of Illinois, have invented a certain new and useful Improvement in Pressure Conduits, of which the following is a full, clear, concise, and exact description, reference being had to the accompanying drawings, forming a part of this specification.

My invention relates to improvements in pressure conduits, and is especially concerned with improvements in pressure conduits formed of concrete or other similar materials.

The objects of my invention are:

First: To provide a pressure conduit formed of a plurality of sections of concrete pipe comprising means for sealing the joints between the pipe sections to withstand the pressure of the fluid passing through the conduit;

Second: To provide a pressure conduit of the type above described in which the joints between the various pipe sections are sealed by means of a strip or band of metal, and preferably a metal which is less electropositive than copper and other metals heretofore used for sealing joints between pipe sections, whereby the electrolytic action upon the metal seal is materially reduced;

Third: To provide means for establishing a more or less flexible connection between pipe sections that can be economically manufactured and at the same time posesses great durability.

Fourth: To provide means for sealing the joint between adjacent pipe sections of a pressure conduit which does not depend upon the adhesion of green cement to old cement for the sealing action; and Fifth: To provide means for sealing the joints between adjacent pipe sections of a conduit of such construction that the conduit can be tested for leakage before the joints are entirely finished, so that in the event any leaks are discovered, the defective joints may be easily and quickly repaired without the necessity of removing any concrete.

Other objects will appear as this description progresses, reference being had to the accompanying drawings, in which.

Figure 1:
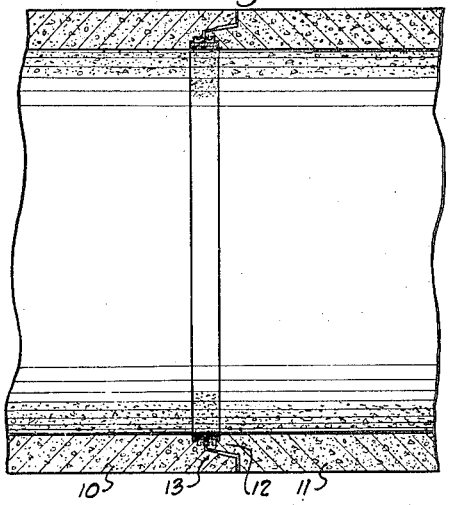
Figure 1 is a central longitudinal section through a pair of adjacent pipe sections having a joint formed in accordance with my invention, portions of the pipe sections being broken away.
Figure 2:
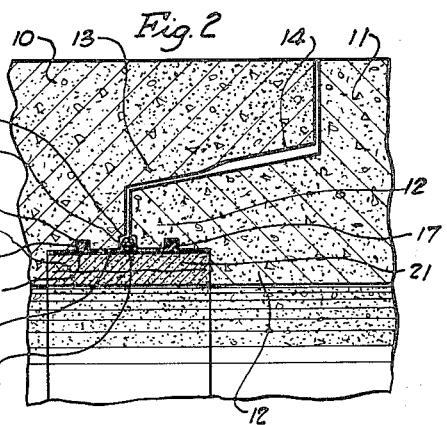
Figure 2 is a fragmentary sectional view showing the joint illustrated in Figure 1 on an enlarged scale.

Figures 5 and 6 are views likewise corresponding to figures 1 and 2 respectively, showing a still further modification of my invention; and Figures 7 and 8 are views corresponding to Figures 1 and 2, showing the application of my invention to bell and spigot pipe sections.

Throughout the several views similar reference characters will be used to refer to similar parts.

Referring to Figures 1 and 2, the reference characters 10 and 11 indicate the adjacent ends of two pipe sections forming a portion of a pressure conduit. One of these pipe sections is provided with an end extension 12, which tapers inwardly toward the end of the conduit, and which is received by a correspondingly formed counterbore 13 in the opposing end of the adjacent pipe section. As clearly shown in Figure 2, the inner periphery of the counter is rebated at 14 to permit a slight angular movement of one pipe section relative to the other; to accommodate the conduit to uneven trench bottoms; or to permit the conduit to be laid along a curve.

The inner walls of the pipe sections are cut away adjacent their ends, so that when the two pipe sections are brought into registering position, they form an annular groove extending about the inner wall of the conduit and on both sides of the joint between the conduit. In Figure 2 I have illustrated annular channels 15 imbedded in the inner walls of the adjacent ends of the pipe sections at the bottom of said groove, these channels preferably being formed of iron. The reference character 16 indicates a metal band preferably made of lead, the edges 17 of which are illustrated as being enlarged in cross-section, and received in the channels 15. The construction of the channels can be formed in several different ways. I prefer to cast the channels 15 in the inner faces of the pipe sections when the pipe sections are formed. Then after the pipe sections are brought together with the extensions fitting into the counterbores, a strip of lead or other suitable material, and of suitable width, can be conformed to the inner periphery of the groove, and the edges of the strip can be calked into the channels. It is to be understood, of course, that my present invention is concerned with pressure conduits having a sufficiently large inner diameter to permit a workman to enter the conduits and form the joint described. The joint just described may be formed in another manner. The channels 15 may be cast in place, and bands of lead may then be forced into the channels, the rings being of sufficient thickness to extend slightly beyond the edges of the channels. A strip of lead of the proper length and width can then be conformed to the inner periphery of the groove, and the edges of the strip fused or "burned" to the portions of the lead rings projecting from the channels.

The lead strip, prior to being conformed to the inner periphery of the conduit and cut to the proper length, is provided with an outwardly extending fold 18 which provides means for compensating for any contraction or expansion in the length of the pipe sections. To prevent this fold from being squeezed and cut by the adjacent ends of the pipe sections, these latter are cut away to form a groove 19 for receiving the fold. After the edges of the strip of lead have been anchored in the channels by either of the above mentioned methods, a layer of asphaltum or asphaltum paper 20, or any other waterproofing material, may be applied to the inner side of the lead strip and those portions of the bottom of the groove which are exposed, to further seal the joint between the lead strip and the pipe sections.

In order to protect the water-proofing layer 20 from abrasion and the action of the fluid flowing through the conduit, I cover it with a layer of cement or concrete 21, in which may be imbedded, if so desired, an annular strip or band 22 of mesh or wire reenforcement. In making the pipe sections, I prefer to use concrete richer in cement for making those portions of the pipe sections which imbed the rings 15 than is used for making the other portions of the conduit sections. These portions surround the parts indicated by the reference characters 15, 23 and 25. By this means I insure a fluid-tight connection between the rings and the cement in which they are imbedded.

Figure 3:
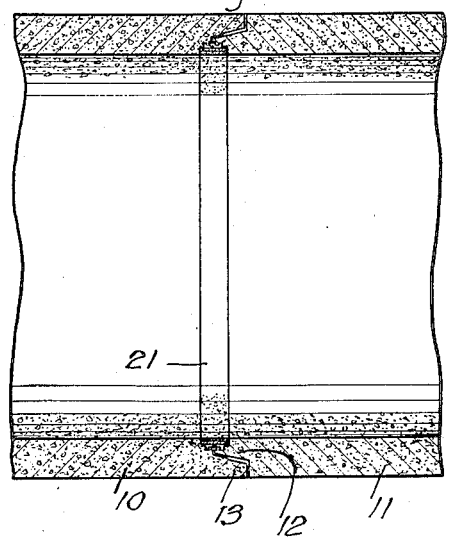
Figures 3 and 4 are views corresponding to Figures 1 and 2 respectively, but showing a slightly modified embodiment of my invention.
Figure 4:
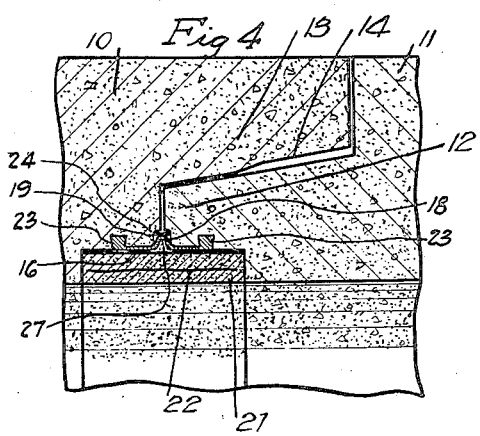

The modified embodiment of my invention disclosed in Figures 3 and 4 is similar to that above described, except that I omit the channels 15 and replace them by wedge-shaped rings 23 of lead or other suitable material, which I preferably mold into the pipe sections when the latter are formed. The edges of the lead strip 16 can then be fused or burned to the projecting inner edges of the rings 23 to form a tight connection. It will of course be understood that in both of the modifications which I have described the meeting ends of the lead strip 16 must also be fused together, in order to form a fluid-tight connection. In this figure I have shown an annular strip 24 which may be formed of any desired material, located at the bottom of the groove 19. The purpose of this strip is to prevent the end of the fold 18 from entering into the narrow portion of the joint between the two pipe sections and being pinched off.

In the modification shown in Figures 5 and 6 I mold the pipe sections with annular grooves 25 in the inner periphery of the end portions into which the edges of the lead strip 16 are calked as indicated.

Figures 7 and 8 illustrate the adaptation of my invention to pipe sections of the bell and spigot type. In these figures the edges of the band 16 are illustrated as being calked into grooves 25, but it will be clear to those skilled in this art that the edges of the band 16 may be secured to pipe sections in any one of the ways described above. In this figure I have shown the counterbore of the bell end of one of the pipe sections as being cut away, or rather formed, to provide a space between the bell and spigot which will permit the pipe sections to be deflected angularly relatively to each other for the same purpose for which the rebate 14 is formed in the inner periphery of the bore 13.

In Figures 2, 4, 6 and 8, the reference character 27 indicates a filling of oakum or other fibrous material, which is placed in the fold in the lead band 16 to prevent the material from which the cementitious layer 21 is made from being forced into the fold during the formation of the joint. This filling is placed in the fold of the band 27 in a very loose condition, so that it will not prevent the two portions of the fold from approaching each other as the pipe sections expand, due to increase in diameter.

In constructing a conduit in accordance with my invention, the pipe sections are arranged end to end, and the lead bands are secured to the pipe sections in the manner described, to form the seals between the adjacent pipe sections. The conduit is then filled and observed to determine whether any of the joints leak. If there are any defective joints, they are noted, and the conduit is drained, the defective joints are repaired, and the layers of concrete 21 are placed over the lead bands, and the job is thus completed. So far as I am aware, in the constructions heretofore employed for providing seals for the joints of pressure conduits, the joint must be entirely completed before the pressure conduit is tested, and in the event any leaks develop, it is necessary to chip out the concrete forming a part of the sealing joint, in order to prepare the same, or if this is not done, no attempt whatever is made to reach the defective metal band, the joint being repaired by merely plugging the holes in the concrete which permit the leakage. The last method of repairing the defective joints is not permanent and is objectionable, and the method is costly. With my improved joint, the defective joints can quickly be discovered and repaired, and the expense of making these repairs is practically nothing.

In most of the means which are in use for sealing the joints between adjacent pipe sections, the effectiveness of the seal is dependent upon the adhesion of green cement to pre-formed concrete, and as it is a more or less difficult and costly job to secure this adhesion, it will be readily seen that inasmuch as my joint does not depend upon such adhesion for its effectiveness, it offers considerable advantages over those heretofore in use.

While I have described the details of the preferred embodiments of my invention, it is to be clearly understood that my invention is not limited to these details, but is capable of other adaptations and modifications within the scope of the appended claims.

Having thus described my invention, what I claim is:

1. A conduit comprising a pair of pipe sections arranged end to end, and means for sealing the joint between contiguous sections comprising a longitudinally expansible band having its lateral edges imbedded in the walls of said contiguous sections, and a band movable with respect to the end of either pipe section for protecting said first named band.

2. A conduit comprising pipe sections arranged end to end, the adjacent ends being conformed to provide an annular groove, and means for sealing the joint between adjacent sections comprising a pliable metal band imbedded in the abutting ends of said adjacent sections, said band having a peripheral fold to permit of relative movement of said sections, said fold only being received in said annular groove.

3. A conduit comprising pipe sections arranged end to end, the adjacent ends being conformed to provide an annular groove, means for sealing the joint between adjacent sections comprising a flexible metal band imbedded in the abutting ends of said adjacent sections, said band having a peripheral fold to permit of relative movement of said sections, said fold being received in said annular groove, and a ring in said groove for protecting the fold in said band against abrasion, substantially as described.

4. A pressure conduit comprising abutting pipe sections, annular grooves adjacent the inner abutting ends of said sections, channels imbedded therein, and a lead band having its edges imbedded in said channels and spanning the joint between said abutting pipe sections.

5. A pressure conduit comprising pipe sections arranged in abutting relation, annular grooves formed in the inner walls of said sections adjacent the abutting ends thereof, a band having its edges lying in said grooves, and means for retaining the edges of said band in said grooves.

6. A pressure conduit comprising pipe sections arranged in juxtaposition, a lead band spanning the joint between contiguous sections, said band having a circumferential fold, an annular layer of cementitious material for holding said band in position, and means in said circumferential fold to permit relative movement of the abutting ends of said pipe sections and to prevent the influx of the cementitious material during the process of completing the joint between contiguous sections, comprising a filling of fibrous material.

7. A conduit comprising pipe sections arranged end to end, grooves in the walls of said sections adjacent the abutting ends thereof to receive means for securing said sections together, the portions of said sections forming said grooves being formed of a denser material than the material forming the remaining portions of said sections, substantially as and for the purpose described.

8. A method of forming a conduit formed of sections which consists in imbedding rings of lead in grooves provided in the inner walls of said sections adjacent the abutting ends thereof, placing said sections in juxtaposition, spanning the space between said rings with a band of lead and fusing the same to said rings.

9. A method of forming a conduit formed of sections which comprises arranging said sections in juxtaposition, spanning the joint between said sections with a band of lead and then calking the edges of said band into channels formed in the inner walls of said sections adjacent said abutting ends.

In witness whereof, I hereunto subscribe my name this 3rd day of May, 1919.

JOSEPH E. MOODY.

Witnesses:
EARL C. ALEXANDER,
EARL F. PIERCE.